(12) United States Patent
Swander et al.

(10) Patent No.: US 7,500,102 B2
(45) Date of Patent: Mar. 3, 2009

(54) METHOD AND APPARATUS FOR FRAGMENTING AND REASSEMBLING INTERNET KEY EXCHANGE DATA PACKETS

(75) Inventors: Brian Swander, Bellevue, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 10/056,889

(22) Filed: Jan. 25, 2002

(65) Prior Publication Data

US 2003/0142823 A1 Jul. 31, 2003

(51) Int. Cl.
*H04L 9/00* (2006.01)
*H04L 1/00* (2006.01)
(52) U.S. Cl. .................................... 713/171; 709/230
(58) Field of Classification Search ................. 713/171; 709/250
See application file for complete search history.

(56) References Cited

U.S. PATENT DOCUMENTS

| | | | | |
|---|---|---|---|---|
| 5,959,974 | A * | 9/1999 | Badt et al. ................... | 370/233 |
| 6,055,236 | A | 4/2000 | Nessett et al. | |
| 6,795,917 | B1 * | 9/2004 | Ylonen ....................... | 713/160 |
| 6,832,322 | B1 | 12/2004 | Boden et al. .................. | 726/15 |
| 6,944,672 | B2 | 9/2005 | Crow et al. .................. | 709/236 |
| 6,957,346 | B1 | 10/2005 | Kivinen et al. ............... | 713/153 |
| 7,032,242 | B1 | 4/2006 | Grabelsky et al. ............. | 726/11 |
| 2002/0015422 | A1 * | 2/2002 | Inada et al. .................. | 370/474 |
| 2002/0131425 | A1 * | 9/2002 | Shalom ....................... | 370/401 |
| 2002/0165973 | A1 * | 11/2002 | Ben-Yehezkel et al. ...... | 709/230 |
| 2003/0233568 | A1 | 12/2003 | Maufer et al. ................. | 726/12 |
| 2004/0088537 | A1 | 5/2004 | Swander et al. ............. | 713/153 |
| 2004/0151322 | A1 | 8/2004 | Sovio et al. .................. | 380/278 |
| 2004/0193875 | A1 | 9/2004 | Aura .......................... | 713/162 |
| 2006/0077908 | A1 | 4/2006 | Park et al. .................... | 370/254 |
| 2006/0173968 | A1 * | 8/2006 | Vaarala et al. ............... | 709/214 |

FOREIGN PATENT DOCUMENTS

| | | |
|---|---|---|
| EP | 1333635 | 6/2003 |
| JP | 2001-7858 | 1/2001 |

(Continued)

OTHER PUBLICATIONS

Clark, "RFC 815—IP datagram reassembly algorithms", 1982, RFC.*

(Continued)

*Primary Examiner*—Emmanuel L. Moise
*Assistant Examiner*—Jeffery Williams
(74) *Attorney, Agent, or Firm*—Merchant & Gould, P.C.

(57) ABSTRACT

A method and apparatus for fragmenting and reassembling IKE protocol data packets that exceed a Maximum Transmission Unit is provided. A transmitting node determines whether to fragment IKE data depending on whether the receiving node has the capability to receive and reassemble fragmented data packets. The transmitting node detects whether fragmentation is appropriate and then intercepts and fragments appropriate IKE payloads for transmission over a network. The invention further includes a method and apparatus for reassembling fragmented IKE payloads. The receiving node discards certain packets according to a set of predetermined rules that are designed to prevent denial of service attacks and other similar attacks. No modification is required to the existing IKE protocol or to other lower level networking protocols.

8 Claims, 7 Drawing Sheets

FOREIGN PATENT DOCUMENTS

| | | |
|---|---|---|
| JP | 2001-211147 | 8/2001 |
| JP | 2003-101518 | 4/2003 |
| WO | WO 02/07378 | 1/2002 |
| WO | WO 2006068450 | 6/2006 |

OTHER PUBLICATIONS

Kent et al., "Fragmentation Considered Harmful", Computer Communication Review, 1995, Association for Computer Machinery.*
IPSEC, "Minutes of IPSEC Working Group Meeting", Proceedings of the 52nd Internet Engineering Task Force, Dec. 9-14, 2001, www.ietf.org/proceedings/01dec/195.htm.*
Definition of DoS, "Glossary for the Linux FreeS/WAN project", Nov. 20, 2000, http://www.freeswan.org/freeswan_trees/freeswan-1.5/doc/glossary.html.*
C. Shannon, D. Moore, and K. Claffy, "Characteristics of fragmented IP traffic on internet links," in Proc. SIGCOMM, 2001, pp. 83-97.*
Cerf, V.; Kahn, R., "A Protocol for Packet Network Intercommunication," IEEE Transactions on [legacy, pre—1988], vol. 22, No. 5pp. 637-648, May 1974.*
Steinke, Steve, "TCP and UDP", Network Magazine, 2001, http://zoo.cs.yale.edu/classes.cs155/fall01/tcpudp.pdf, accessed Dec. 4, 2006.*
Jinmei, Tatuya, "How to write UDP/IPv6 applications that care about path MTU", Dec. 2000, playground.sun.com/ipv6/presentations/Dec2000/ietf49-udpapp.pdf, accessed Dec. 4, 2006.*
Thread Topic, "RE: CERT_REQ_PAYLOAD usage", Sep. 2000, http://www.vpnc.org/ietf-ipsec/00.ipsec/msg01624.html, accessed Dec. 4, 2006.*
Muegge, Mark, "Encryption Issues: Moving Toward Higher Performance Network Security Systems", 1999, Computer Technology Review, p. 1-5.*
Aboba et al., "Securing iSCSI, iFCP and FCIP", 2001, IPS Working Group, p. 1-42.*
"RE: Reminder: last call for PIC in the IPSRA WG", Thread Topic, 2001, http://www.vpnc.org/ietf-ipsra/mail-archive/msg01151.html.*
Maughan, Internet Security Association and Key Management Protocol (ISAKMP), 1998, RFC 2408.*
Harkins, et al., "The Internet Key Exchange (IKE)", 1998, RFC 2409.*
Harkins et al., "The Internet Key Exchange (IKE) Protocol," *IPSEC Working Group Internet-Draft* (Nov. 2001).
IPSEC, "Minutes of IPSEC Working Group Meeting," *Proceedings of the 52nd Internet Engineering Task Force*. Dec. 9-14, 2001, Salt Lake City, UT, U.S.A. (Dec. 12, 2001). Retrieved from the internet on Apr. 13, 2005: http://www/ietf.org/proceedings/01dec/195.htm.
Kent et al., "Fragmentation Considered Harmful," *Computer Communication Review* (Association for Computer Machinery), 25 (1), 75-87 (Jan. 1995).
Mogul et al., "Path MTU Discovery," *Internet Engineering Task Force, Network Working Group, Request for Comments:* 1191, (Nov. 1990). Also available on the internet: http://www.ietf.org/rfc/rfc1191.txt.
Harkins, et al., *The Internet Key Exchange (IKE)*, The Internet Society, RFC 2409, pp. 1-40 (Nov. 1998).
Kent et al., *Security Architecture for the Internet Protocol*, The Internet Society, RFC 2401, pp. 1-65 (Nov. 1998).
Kent et al., *IP Authentication Header*, The Internet Society; RFC 2402, pp. 1-21, (Nov. 1998).
Kent et al., *IP Encapsulating Security Payload (ESP)*, The Internet Society, RFC 2406 pp. 1-21, (Nov. 1998).
Maughan et al., *Internet Security Association and Key Management Protocol (ISAKMP)*, The Internet Society, RFC 2408, pp. 1-85, (Nov. 1998).
Benantar, M., *The Internet public key infrastructure*, IBM Systems Journal, vol. 40, No. 3, pp. 648-665 (2001).
Cheng, P.C., *An architecture for the Internet Key Exchange Protocol*, IBM Systems Journal, vol. 40, No. 3, pp. 721-746 (2001).
"Internet Key Exchange (IKE) protocol [RFC2409]", Network Working Group, Nov. 1998.
Pau-Chen Cheng, Juan A. Garay, Amir Herzberg, and Hugo Krawczyk, "Design and Implementation of Modular Key Management Protocol and IP Secure Tunnel on AIX," Jun. 1995. http://db.usenix.org/publications/library/proceedings/security95/full_papers/cheng.ps.
P. Cheng, J. A. Garay, A. Herzberg, H. Krawczyk, "A security architecture for the Internet Protocol," 1998, vol. 37, No. 1. http://www.princeton.edu/~rblee/ELE572Papers/Fall04Readings/pau-cheng.pdf.
Alessandro Bassil, Julien Laganier, "Towards an IPv6-based Security Framework for Distributed Storage Resources" Communications and Multimedia Security CMS 2003, Oct. 2-3, 2003. http://loci.cs.utk.edu/ibp/files/SOURCE.pdf.
"Development of Router Clusters to Provide Fast Failover in IP Networks", Digital Technical Journal vol. 9 No. 3, 1997. http://citeseer.ist.psu.edu/cache/papers/cs/5595/http:zSzzSzwww.digital.comzSzinfozSzDTJR02zSzDTJR02P8.pdf/higginson97development.pdf.
Van De Snapschout, Jan L.A., "The Sliding Window Protocol Revisited," Formal Aspects of Computing vol. 7, pp. 3-17, 1995.
Aura, T. "Cryptographically Generated Addresses (CGA)," RFC 3972, Mar. 2005.
Kaufman, C. "Internet Key Exchange (IKEv2) Protocol," RFC 4306, Dec. 2005.
Kent, S. and Atkinson, R. "Security Architecture for the Internet Protocol," RFC 2401, Nov. 1998.
Link, B.; et al. "RTP Payload Format for AC-3 Audio," RFC 4184, Oct. 2005.
Nir, Y. "Repeated Authentication in Internet Key Exchange (IKEv2) Protocol," RFC 4478, Apr. 2005.
Tannenbaum, AS. "Section 4—The Data Link Layer," Computer Networks, Prentice-Hall, 1989.
Aura, T., Cryptographically Generated Addresses (CGA), RFC 3972, Mar. 2005.
Housley, R., Using Advanced Encryption Standard (AES) CCM Mode with Ipsec Encapsulating Security Payload (ESP), Comments: 4309, Dec. 2005, 13 pgs.
Kent et al. "IP Encapsulating Security Payload (ESP)," Network Working Group, Comments 4303, Dec. 2005, 42 pgs.
Kent, S., "IP Authentication Header", Network Working Group, Comments: 4302, Dec. 2005, 35 pgs., http://rfc.net/rfc4302.html.
Kent, S. "Security Architecture for the Internet Protocol", Network Working Group, Comments: 4301, Dec. 2005, 95 pgs., http://www.rfc-editor.org/rfc/rfc4301.txt.
Laganier, J. "Using IKE with IPv6 Cryptographically Generated Address," Network Working Group, Internet-Draft. Feb. 24, 2003, pp. 1-14.
Laganier, J. "Using IKE with IPv6 Cryptographically Generated Address," Network Working Group, Internet-Draft. Jul. 8, 2007, 21 pgs.
Nir, Yoav, Repeated Authentication in IKEv2, May 11, 2004 pp. 1-3.
Nir, Y., Repeated Authentication in Internet Key Exchange (IKEv2) Protocol, Apr. 2006, pp. 1-5.
Translation of Japan Official Notice of Rejection dated Apr. 11, 2008 in Japanese Patent Application No. 2003-018021.
European Examination Report dated Jan. 17, 2006 for European Application No. 02028878.3.
Response to European Examination Report dated May 29, 2006 for European Application No. 02028878.3.
European Examination Report dated Feb. 9, 2007 for European Application No. 02028878.3.
Response to European Examination Report dated Jun. 19, 2007 for European Application No. 02028878.3.

* cited by examiner

(Prior Art)

METHOD AND APPARATUS FOR FRAGMENTING AND REASSEMBLING INTERNET KEY EXCHANGE DATA PACKETS

TECHNICAL FIELD

The invention relates generally to fragmenting and reassembling data packets and, more particularly, to fragmenting and reassembling data packets that are created through a protocol stack that implements the Internet Key Exchange ("IKE") protocol.

BACKGROUND OF THE INVENTION

Information that is transmitted over public networks, including the Internet, often contains confidential and private data. For example, an individual who desires to purchase goods or services in an on-line transaction may be required to transfer funds and/or supply credit card or banking information to the merchant. In addition, authorized senders and recipients may desire to transmit information that is confidential, such as a corporate strategy document, over the Internet. For obvious reasons, this information is extraordinarily tempting to criminals and other eavesdroppers, who may be highly motivated to intercept secret and/or private data.

Due to the nature of the Internet and other public networks, it is impossible to guarantee that only intended recipients will have access to sensitive information. Data transfers are not ordinarily encrypted or scrambled, and eavesdroppers may readily intercept information that is intended only for select individuals or a group of individuals. Thus, unless certain precautions are taken, such as encryption of the data, an individual that uses the Internet or any public network as a transmission medium may risk compromising sensitive information.

In order to reduce this risk, many computer users encrypt data to be transmitted over a network, thereby reducing the risk that an unauthorized listener may intercept and read the data. Encryption is typically accomplished through the use of an appropriate mathematical function to change an intelligible string of numbers into a form that is not easily deciphered. Decryption is accomplished by reversing the process. The encryption and subsequent decryption may be performed through the use of a pair of "keys." The two keys are related such that one operation, encryption for example, can be performed using one key from the pair, while the reverse transformation can only be computed using the other key in the pair. Unauthorized eavesdroppers that do not have access to the key set used to encrypt and decrypt the information will typically find it infeasible to access the confidential data. The key exchange is thus a critical part of establishing secure communications over a data network.

The computing industry in general, and the Internet Engineering Task Force (IETF) in particular, has adopted security standards and protocols that, when implemented, are useful to encrypt data. In addition, the IETF has established an Internet Protocol Security (IPsec) working group, which has published a number of standards and Requests for Comments (RFCs). These documents provide details as to proposed or de-facto industry standard encryption techniques. This working group has published, among others, the "The Internet Key Exchange (IKE)," by D. Harkins and D. Carrel, RFC-2409, November, 1998, which is incorporated herein by reference.

The IKE protocol was designed to negotiate and provide authenticated keying material for security associations ("SAs"). The IKE protocol, among other things, is particularly useful for the secure exchange of encryption keys between two computers. Keys exchanged through the IKE protocol may be used to subsequently encrypt and decrypt information transmitted between computers over a public or private network.

The IKE protocol adheres to the high-level semantics for key management protocols specified by the Internet Security Association and Key Management Protocol (ISAKMP) and the Internet IP Security Domain of Interpretation (DOI). The IKE protocol is typically implemented on a high-level layer of a suite of network protocol stacks. An application within a network node typically invokes the IKE protocol stack, which subsequently generates a series of well-defined messages. The code that implements the IKE protocol, i.e., the IKE protocol stack, is further responsible for transmitting messages to the intended recipient node. The IKE protocol stack, however, does not implement all of the operations that are necessary to communicate over a network. Instead, like other high-level services and applications, the IKE protocol stack relies on lower-level stacks that implement protocols such as the User Datagram Protocol (UDP) and the Internet Protocol (IP) to facilitate network communications.

All communications over an IP network are accomplished by the transmission and switching of fixed-sized data packets. Depending on the network, the IP protocol stack will transmit a maximum length packet, which length is identified as the Maximum Transmission Unit (MTU). The MTU may be specified for a network or for an application on a network. Some IP networks and applications provide a mechanism for revealing or explicitly providing the MTU, e.g., they will provide an MTU value in response to a query from the transmitting application. In addition, the IP protocol itself includes limited provisions for determining the MTU for a given network or application, which determination is known as MTU discovery. It may not always be possible, however, to determine the MTU for a given network or application. If the MTU is known or discovered, and if data that a user seeks to send over an IP network exceeds the MTU for that network or application, the IP protocol stack will repackage the data into smaller packets that do not exceed the relevant MTU. The step of repackaging is also known as fragmentation. Smaller fragmented data packets that do not exceed the relevant MTU are then transmitted over the network to the intended recipient, where they are subsequently reassembled into the original data.

Like any other data, the information contained within an IKE packet, also known as IKE payloads, may at times exceed the MTU for a given network or application. Thus, an IP protocol stack that is running on an IKE-enabled transmitting application will fragment an IKE payload into a size that does not exceed the MTU. Indeed, the IKE protocol stack does not set a DF (don't fragment) flag that is contained as part of an IKE message. Consequently, the IKE protocol authorizes any IP stack to fragment IKE payloads as appropriate.

In addition, a local IP stack may be unaware of the lowest MTU on a node or link that is downstream of the initiating IKE node. Thus, even though the IP stack of the initiating node may fragment an IKE payload, the resulting fragments still may be too large for certain networks and applications. This condition may cause yet additional fragmentation of the IKE payload.

Fragmentation of the IKE payloads by known techniques, such as those employed by the IP stack, will not reliably transmit IKE messages across a network. This is because ordinary IKE payloads are transmitted according to the UDP protocol, which does not track fragmented IP packets. In addition, many network components, such as Network Address Translators (NATs), also do not track IP fragments. Thus, if any IKE payload fragment is dropped, entire IKE payload will be compromised. As a consequence, the receiving IKE peer will not be able to validate or respond to messages from the transmitting IKE peer.

An intended IKE peer may not receive a transmitted IKE packet for a variety of reasons. For example, problems with the network infrastructure between IKE peers, i.e., cabling problems, data collisions, software difficulties, etc., may cause packets to be dropped on a seemingly random basis. For these types of communication problems, it is possible to retransmit the dropped IKE packets, and thereby achieve a successful message exchange. As another example, certain applications, such as NATs, may have a systemic problem in handling IKE packets. This is because an IP fragment that is associated with an IKE packet may not contain sufficient information to permit the NAT to appropriately format or route data. Many IP fragments ordinarily will not contain port or other state information that the NAT requires to perform address and source translations. Thus, IP fragments may be routinely dropped by certain NATs.

Accordingly, there is a need for an improved method and system for handling data packets created pursuant to the existing IKE protocol. More specifically, there is a need for a system and method to fragment IKE payloads that exceed a given MTU into smaller packets that do not exceed the MTU. The IKE payload fragmentation should be conducted in such a manner that IKE packets may be reassembled at a receiving node.

SUMMARY OF THE INVENTION

In accordance with this need, the inventive system and method provides a mechanism for fragmenting and reassembling data packets and, more particularly, for fragmenting and reassembling data packets that are created through a protocol stack that implements the Internet Key Exchange ("IKE") protocol. According to the invention, no substantial modification to the IKE protocol is required to fragment or reassemble the IKE payload. Instead, the present inventive system and method determines whether it is necessary for the transmitting node to fragment outgoing IKE data packets and whether the receiving node is capable of receiving the fragmented packets. The present inventive system and method further intercepts outgoing IKE data packets on the transmitting node if the size of such packets exceeds a specified threshold and if the receiving node is capable of receiving fragmented packets. The IKE packets are then fragmented into smaller data packets that are transmitted over a network and received at the receiving node. A module within the receiving node that buffers fragmented packets and subsequently reassembles the original IKE payload consumes the fragmented IKE packets. The inventive system and method further includes numerous features that protect the nodes on the network from various attacks.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION OF THE INVENTION

The present invention may be implemented by programming code modules that are executed by a computer. Generally, program modules include routines, objects, components, data structures and the like that perform particular tasks or implement particular abstract data types. The terms "program" and "module" as used herein may connote a single program module or multiple program modules acting in concert. The invention may be implemented on a variety of types of computers, including personal computers (PCs), telephones, hand-held devices, multi-processor systems, microprocessor-based programmable consumer electronics, network PCs, minicomputers, mainframe computers and the like. The invention may also be employed in thin clients and distributed computing environments, where tasks are performed by remote processing devices that are linked through a communications network. In a distributed computing environment, modules may be located in both local and remote memory storage devices.

Figure 1:
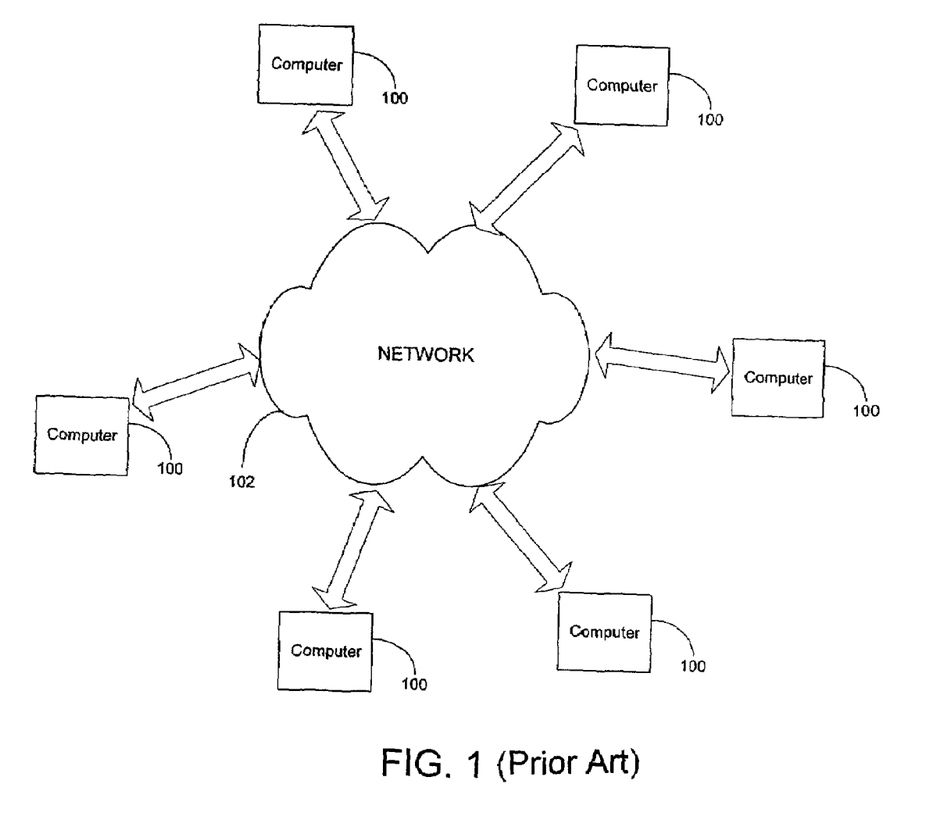
FIG. 1 is a block diagram illustrating an exemplary computer network.

An example of a networked environment in which the invention may be employed will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
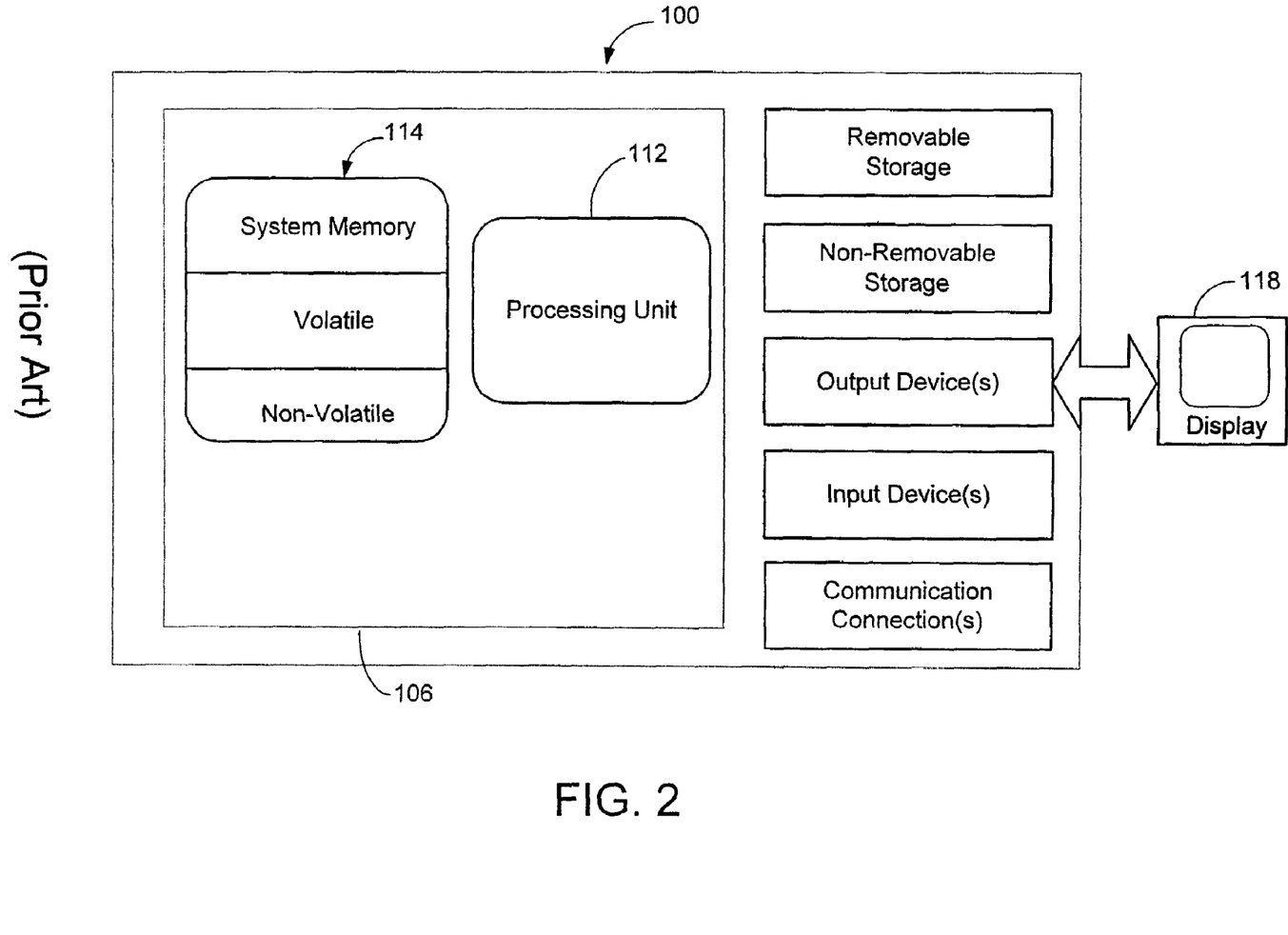
FIG. 2 is a block diagram illustrating an exemplary computer.

Referring to FIG. 2, an example of a basic configuration for a computer 100 on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 3:
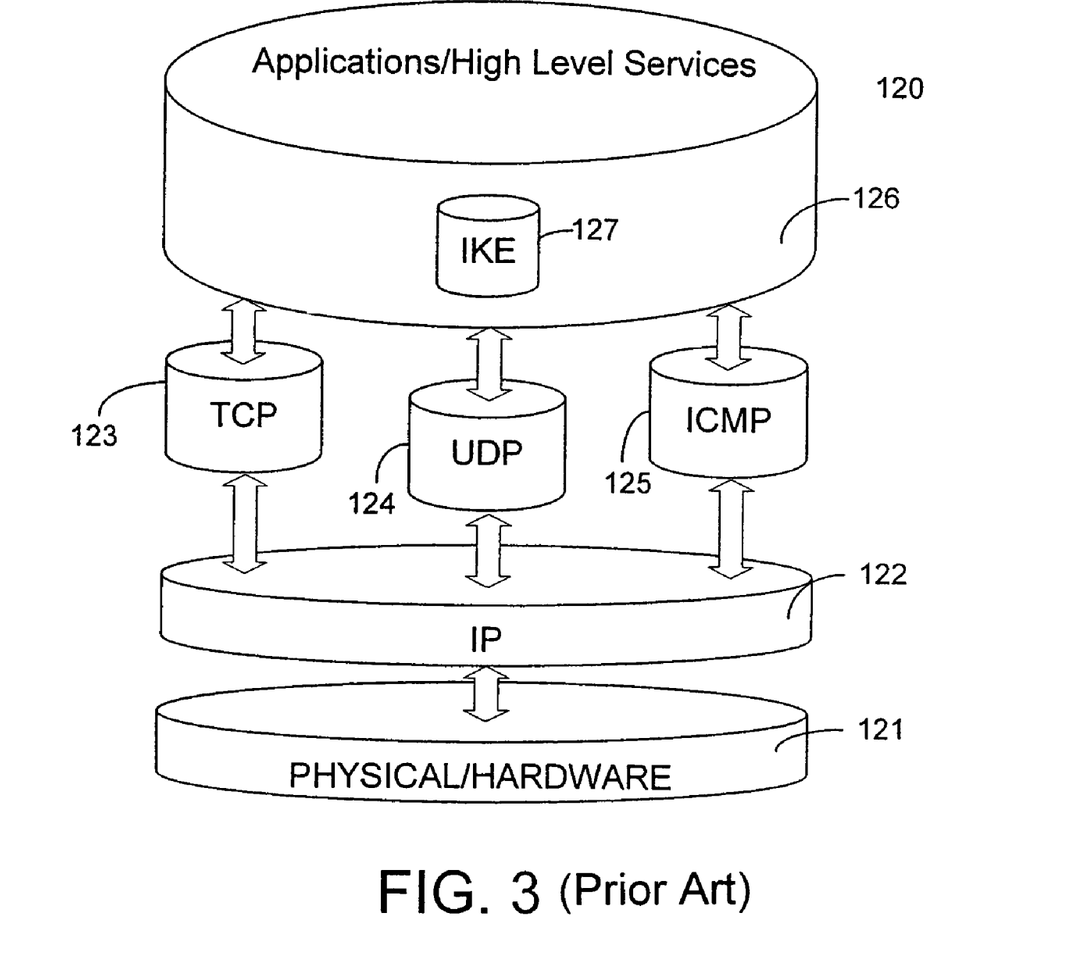
FIG. 3 is a block diagram illustrating exemplary hardware and software components that enable one computer to interconnect with another.

FIG. 3 illustrates the logical devices, applications, and programming code modules, collectively identified by reference numeral 120, which enable computer 100 to communicate over a network. This figure illustrates, among other things, an exemplary suite of protocol stacks, identified by reference numerals 122 through 126. The physical/hardware components 121 illustrated in FIG. 3 may include, for example, a Network Interface Card (NIC) and various device drivers for the hardware components. Above the physical and hardware layer is the network IP stack 122 that implements the Internet Protocol (IP). The IP stack 122 implements the addressing protocol that is designed to route traffic within a network or between networks.

Above the IP stack 122 are several additional protocol stacks including a Transmission Control Protocol (TCP) stack 123, a User Datagram Protocol (UDP) stack 124, and an Internet Control Message Protocol (ICMP) stack 125. TCP stack 123 provides the code for implementing a connection-oriented, end-to-end reliable protocol. TCP stack 123 further insures reliable inter-process communication between network devices. UDP stack 124 provides the code for implementing a connectionless mode of communications with datagrams in an interconnected set of computer networks. The UDP protocol does not guarantee packet delivery or that duplicate packets have not been sent. Finally, ICMP stack 125 includes the code that is necessary for Internet Protocol control. The main functions of the ICMP stack 125 include error reporting, route-change notification, performance, subnet addressing and other maintenance. Although components 122-125 have been illustrated as a portion of the preferred embodiment, none are absolutely required to implement the invention. Alternatives to these protocol stacks may be used, either separately or in combination with various of the foregoing protocol stacks, to form a network connection between nodes on a network. More or fewer protocols could also be used.

The application and high-level services comprise the highest layer 126. This is where application programs to carry out desired functionality for a network device reside. For example, the application programs for the computer 100 may include printer application programs. This is also where the IKE protocol stack 127 resides. The IKE protocol stack 127 permits the secure exchange of encryption keys between two computers. Keys exchanged via the IKE protocol stack 127 may be used to subsequently encrypt information transmitted between computers over a public or private network. An application that seeks to establish a Security Association (SA) may invoke the IKE protocol stack 127 to begin the process of key exchange and other related information.

IPsec has published several documents that provide details on establishing an SA between nodes. One such document, which is incorporated herein by reference, is "Security Architecture for the Internet Protocol", by S. Kent and R. Atkinson, RFC-2401, November 1998. Starting from a state in which no connection exists between two network nodes, an SA can be established such that each endpoint trusts the security of the connection and an identity of each node is authenticated to the other. IPsec specifically defines two security services, each having an associated header that is added to an IP packet that it protects: an Authentication Header ("AH") and an Encapsulating Security Payload ("ESP") header. The IPsec document, "IP Authentication Header," by S. Kent and R. Atkinson, RFC-2402, November, 1998, describes the AH header and is incorporated herein by reference. The IPsec document, "IP Encapsulating Security Payload (ESP)," by S. Kent and R. Atkinson, RFC-2406, November 1998, describes the ESP header, and is also incorporated herein by reference.

IPsec protocols establish and use an SA to identify a secure virtual connection between two endpoints. An SA is a unidirectional connection between two endpoints that represents a single IPsec protocol-mode combination. Two termination endpoints, i.e., network devices, of a single SA define a secure virtual connection that is protected by IPsec services. One of the endpoints sends IP packets, and the other endpoint receives them. Since an SA is unidirectional, a minimum of two SAs is required for secure, bi-directional communications. It is also possible to configure multiple layers of IPsec protocols between two endpoints by combining multiple SAs.

The process of establishing an IPsec SA involves both negotiation and authentication. The negotiation results in an agreement between the two endpoints as to which security protocol and mode to use, as well as specific encryption techniques and associated parameters. The authentication ensures that each endpoint can trust the identity of the other endpoint during negotiation, and hence after the SA is established.

The IKE protocol has been proposed as a standard for establishing SAs. As noted above, the IKE protocol adheres to the ISAKMP semantics, which are described in "Internet Security Association and Key Management Protocol," by D. Maughan, M. Schertler, M. Schneider and J. Turner, RFC-2408, November, 1998, and incorporated herein by reference. SA negotiation is carried out as a sequence of messages that are exchanged between nodes on a network.

Figure 4:
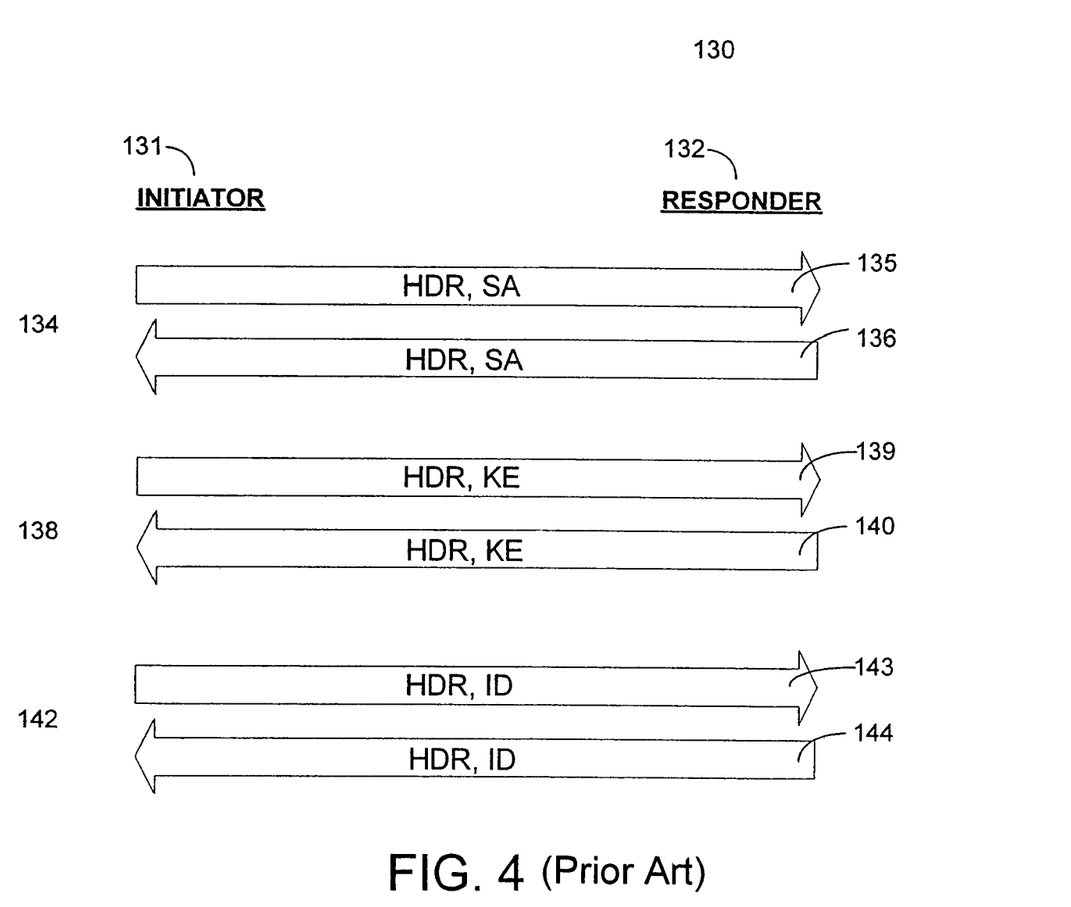
FIG. 4 is a representation of messages that may be exchanged between two interconnected computers according to the IKE protocol.

FIG. 4 illustrates a typical set of messages that are exchanged according to the ISAMKP and IKE protocols. The network nodes are indicated in FIG. 4 as an initiator node 131 and a responder node 132. In the first sequence of messages, indicated by reference numeral 134, the initiator node 131 proposes in message 135 a security protocol and encryption algorithm. The message 135 includes an IKE header, labeled HDR, and the data corresponding to an appropriate SA message. The responder sends a response message 136 that indicates its acceptance or counter-proposal to the first message 135. The response message also includes an IKE header, labeled HDR, and the data corresponding to its response SA message. Once the first set of messages are complete, both the initiator node 131 and responder node 132 have agreed to negotiated details.

The next pair of messages, identified by reference numeral 138, includes key exchange. The initiator node 131 first transmits message 139 that includes an IKE header, key exchange payloads and nonces. The responder node 132 provides a message 140 of its own that also includes key exchange payloads and nonces. From this information an exclusively shared secret may be derived, which leads to key generation and future key management.

The final pair of messages 142 again includes a message 142 from the initiator node 131 and a response message 144 from the responder node 132. The final message pair provides an identification of the communicating nodes. Thus, the initiator node's message 143 includes an IKE header and the ID payload of the initiator. The responder node's message 144, in turn, again includes an IKE header and the ID payload of the initiator. More details regarding possible messages that may be exchanged between the respective nodes are contained in the Harkins RFC identified above and in "An Architecture for the Internet Key Exchange Protocol" by P. C. Cheng, IBM System Journal, Vol. 40, No. 3, 2001, which is incorporated herein by reference. In addition, the various IPsec protocols, SA messages and the like are further discussed in U.S. Pat. No. 6,055,236 to Nessett et al., which is also incorporated herein by reference.

The messages transmitted according to the IKE protocol are variable in both content and length of data. Depending on the results of the negotiation that occurs in the first pair of IKE protocol messages 134, the subsequent messages can vary. In addition, the length of the certification chains that are exchanged as part of the IKE ID messages 142 may vary depending on the certification authority and other factors that are beyond the control of the initiator node and the responder node. As a result, it is possible for the messages to exceed a Maximum Transfer Unit (MTU).

According to known techniques, the local IP protocol stack will fragment an IKE payload into a size that does not exceed the MTU. In addition, other routers and network devices further downstream from the transmitting node will further fragment the IKE payload. This will not cause a problem if all fragments are successfully transmitted. However, if any of the IKE payload fragments are dropped, neither the initiator node nor the responder node will have any way to track the dropped fragment. As a consequence, an IKE peer will not be able to validate or respond to messages from another IKE peer. This is a problem particularly for devices, such as certain types of NATs, that may have a systemic problem in handling IKE packets. An IKE fragment that is formatted according to known techniques may not contain sufficient information to permit a NAT to appropriately route it or any other related fragments.

The inventive system and method solves this problem by detecting whether the responding node is receiving the outgoing IKE payloads. If not, the code that implements the invention may cause retransmission of the IKE payload at least one additional time. This aspect of the invention handles the case of random or sporadic transmission difficulties and prevents unnecessary fragmentation of IKE packets. If the retransmitted packet still does not appear to have been received by the responding node, the invention will fragment the IKE payload into a smaller size that may be successfully transmitted over the network.

Figures 5, 6:
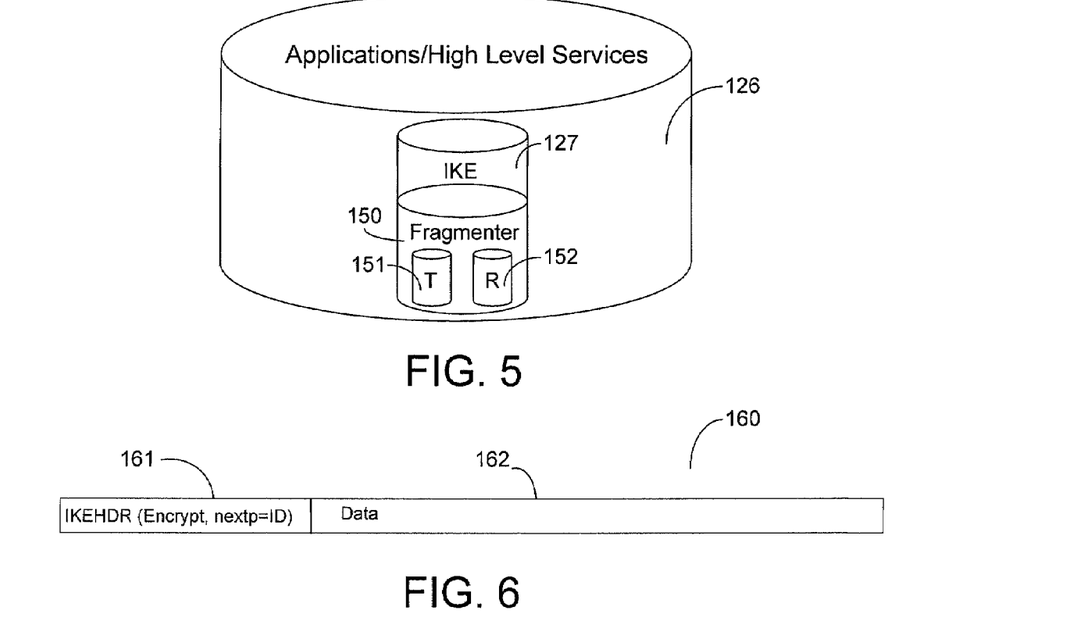
FIG. 5 is a block diagram of a preferred embodiment of the fragmenter/reassembler as implemented in accordance with the present invention.
FIG. 6 illustrates an exemplary data packet that may be exchanged according to the IKE protocol.

FIG. 5 illustrates the logical relationship between the code modules that implement a preferred embodiment of the invention. This figure reproduces the application and high level services layer 126 of the network environment generally illustrated in FIG. 3. In addition to the IKE protocol stack 127, however, FIG. 5 includes a fragmenter/reassembler code module 150 (hereafter, "fragmenter 150") that resides in the application layer 126, but is logically below the IKE protocol stack 127. In an environment that supports IKE fragmentation, a fragmenter 150 will reside on both the initiator node and the responder node.

Fragmenter 150 fragments IKE data packets through a transmission module 151 and reassembles IKE data packets through a receiving module 152. In addition, fragmenter 150 contains the logic that is necessary to detect whether IKE data packets have been received at the responding node and to cause the retransmission of IKE payloads as necessary. Thus, fragmenter 150 performs many functions beyond fragmentation or packet reassembly, and the descriptive name for this module should not be construed in a limiting fashion.

The placement of fragmenter 150 beneath the IKE protocol stack insures that little or no changes to the IKE protocol will be required to implement the invention. This may be particularly advantageous because the invention will be interoperable with preexisting implementations. In addition, locating the inventive code beneath the IKE protocol stack provides a readily deployable solution to the problem of dropped IKE fragments. Finally, by not modifying the IKE protocol state machine, the underlying security of the IKE protocol is not compromised.

In operation, fragmenter 150 intercepts outgoing IKE packets on the one node and also incoming IKE packets on the other node. If necessary, these intercepted packets are fragmented on one end and reassembled on the other. Any processing that must be undertaken to accomplish the fragmentation or reassembly of IKE payloads is thus transparent to the IKE protocol stack.

FIG. 6 illustrates an IKE ID packet 160, which corresponds, for example, to message 143 in FIG. 4. The packet includes an IKE header 161, which includes, among other things, a flag to indicate whether the data in the payload has been encrypted. It further includes information that identifies the next IKE packet. In addition, the IKE packet includes the actual data that comprises the ID payload. Among other things, this data includes the certification chains that are required to establish and maintain an SA.

Figure 7:
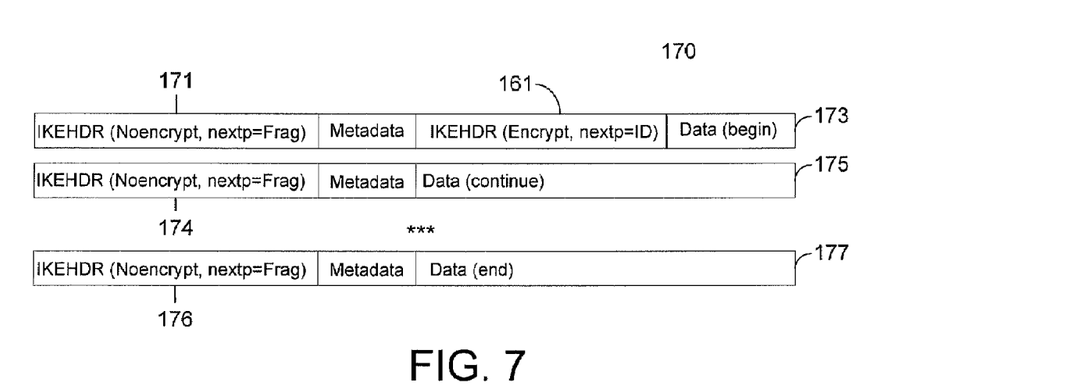
FIG. 7 illustrates an exemplary IKE data packet as modified by a preferred embodiment of the fragmenter/reassembler as implemented in accordance with the present invention.

FIG. 7 illustrates the same data as that in FIG. 6, but as fragmented by the fragmenter 150. In a manner more fully described below, the fragmenter 150 is operable to transform a single message that exceeds an MTU into a plurality of smaller messages. It further adds an IKE header onto each smaller message, which includes only a portion of the original IKE payload. The collection of packets illustrated in FIG. 7 includes all of the data 162 that comprised the original IKE ID payload. In addition, the first fragment 171 also includes the original IKE header 161. Thus, the fragmenter 150 retains all of the original data provided by the IKE protocol stack 127. It truncates the data portion of IKE payloads, particularly but not exclusively for the IKE ID payloads, and then encapsulates the data within a new smaller packet, the length of which does not exceed a selected MTU. Other packets contain the remainder of the truncated data.

Figure 8:
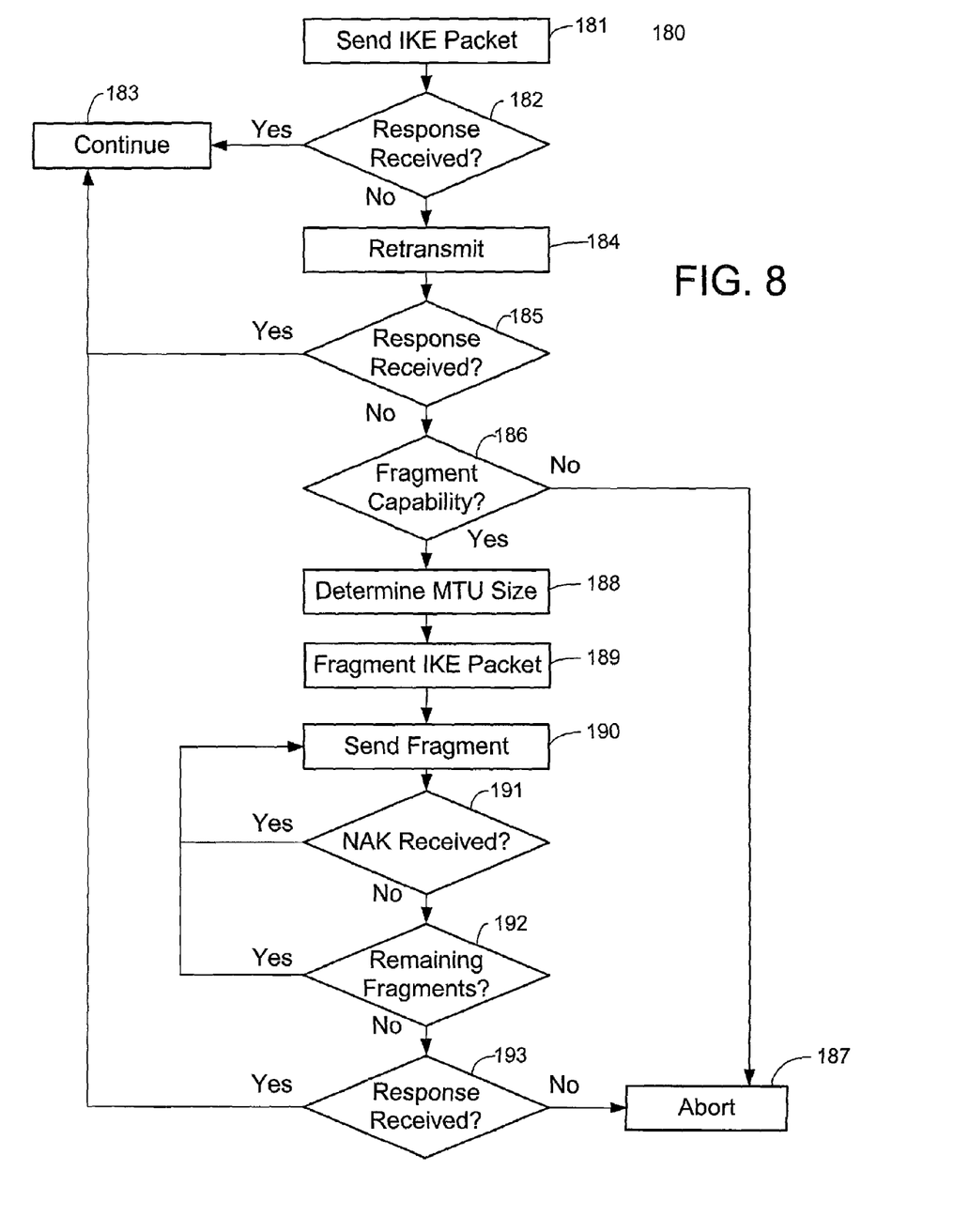
FIG. 8 is a flow chart diagram illustrating certain preferred steps for fragmenting and transmitting a data packet that has been implemented according to the IKE protocol.

FIG. 8 illustrates the logical flow of the code module that implements fragmenter 150. It should be understood that this flow diagram is provided for a preferred embodiment and is not exhaustive of all possible modifications that would be understood to a person of skill in the art. It should be further understood that the logic depicted in FIG. 8 is directed mostly to the transmitter module 151 within the fragmenter 150, although the receiving module 152 may perform certain steps.

Beginning at step 181 of FIG. 8, the initiator node of an IKE application that desires to establish an SA with a responder node will transmit an IKE message. This message may be any of the messages illustrated in FIG. 4 or any message by the IKE protocol stack. The fragmenter 150 monitors the message and, after a suitable time interval, determines whether an appropriate response has been received, step 182.

If a suitable response has been received, the fragmenter 150 will simply permit the process to continue according to the usual IKE protocol, step 183. According to this logic, no fragmentation will occur if the IKE payloads are successfully transmitted.

If a suitable response is not received at step 182, however, the fragmenter 150 will retransmit the appropriate IKE payload, step 184. This step, which may be repeated more than one time, is implemented to address the situation where the IKE payload size has not caused a communications problem. For example, an IKE payload may have been inadvertently dropped by a temporary device malfunction, in which case fragmentation according to the present invention will not be required. By first retransmitting the original IKE payload, the fragmenter 150 detects whether it is possible to receive a suitable response without fragmentation of the original IKE payload. The dashed line connecting step 185 with step 184 indicates that the transmitter module 151 may attempt to retransmit the IKE payload three or four times, for example, before continuing to step 186. This step thus saves network bandwidth and further insures that the IKE fragmenter need not be unnecessarily invoked. If a suitable response is received after retransmission, step 185, the fragmenter 150 permits the IKE protocol stack to again continue without further fragmentation, step 183.

If, however, the fragmenter 150 still does not receive an appropriate response after one or more attempts to retransmit the original IKE payload, step 185, it will determine that the IKE payload exceeds the MTU for the particular network or application. In this case, the transmitter module 151 will either begin the fragmentation process or it will cause the initiator node's IKE protocol stack to abort the process of establishing an SA with the responder node. This determination step is indicated by reference numeral 186. In step 186, the transmitter module 151 determines whether a receiving module has the capability of receiving fragmented packets. If it does not, the fragmenter 150 may again attempt to retransmit the IKE payload one or more times (step not shown), or it will abort the entire process, step 187. On the other hand, if the receiving node has its own fragmenter and capable receiving module, the transmitter module will begin the process of fragmenting the IKE payload for transmission.

In a preferred embodiment, the fragmenter 150 is able to determine the fragmentation capabilities of the receiving node by reference to a vendor identification value (vendor ID) that is transmitted during one of the first exchanges in the process of establishing an SA. This vendor ID is typically exchanged as a part of the IKE protocol. By referring to a look-up table or other similar method, the transmitter module 151 will be able to determine whether the receiver module 152 has the capacity to handle fragmented IKE payloads.

After determining that a suitable receiving module exists, the transmitter module 151 of fragmenter 150 will begin to fragment the original IKE payload. The first step in the fragmentation process is to determine an appropriate value for the MTU, step 188. In a preferred embodiment, the appropriate MTU to use in the fragmentation process is the smallest possible transmission unit that is specified for the particular network upon which the initiator node and responder node are communicating. For example, the smallest dialup transmission unit for certain networks and applications is 576 bytes. Thus, in step 188, the MTU size will be determined to be 576 bytes.

In an alternative embodiment, the fragmenter 150 may attempt to determine the MTU through an iterative process whereby increasingly smaller packet sizes are selected until a suitable response is received. This iterative process is not illustrated in the logic of FIG. 8, but based on the foregoing description, could be readily implemented by persons of ordinary skill in the art. After the appropriate MTU has been determined, whether it is an optimal value determined by an iterative process or an absolute value, the fragmenter 150 will accordingly reduce the MTU that will be used for future IKE-related communications.

In the next step, the fragmenter 150 fragments the original IKE payload, step 189. This process includes encapsulation and truncation of the original IKE payload. As illustrated in FIG. 7, the original IKE header 161 is also encapsulated and the payload data is then divided into separate packets such that the combination of IKE headers and data does not exceed the newly determined MTU size, step 189.

In a preferred embodiment, the data included in the fragmented IKE packets will be a new IKE payload type ISA_FRAG defined as follows:

```
typedef struct frag_payload_ {
    unsigned char next_payload;
    unsigned char reserved;
    unsigned short payload_len;
    unsigned short fragment_id;
    unsigned char fragment_num;
    unsigned char flags;
} frag_payload;
```

Each fragment will thus include information (metadata) that uniquely identifies the original IKE payload and its position within the original IKE payload. For example, the metadata transmitted in a first fragmented message, such as message 171, may be as follows: {id=1, num=1, flags, last_packet_flag=false}. The data transmitted in a second message, such as message 174, may be as follows: {id=1, num=2, flags, last_packet_flag=false}. Finally, the data transmitted in a third message, such as message 176, may be as follows: {id=1, num=3, flags, last_packet_flag=true}. As described below, the receiving module 152 uses this information to reassemble the original IKE payload. It also uses this information to thwart attacks by third parties on the initiator and/or responder.

In step 190, all fragments are then transmitted over the network, each of which does not exceed the determined MTU value. This is advantageous because IKE fragments created according to the present invention may be efficiently processed by certain types of NATs or firewalls that either cannot track prior art IKE fragments or have difficulty doing so. In these and other similar devices, an IKE fragment that was created through previously known techniques may not have all of the state information required for the NAT or firewall to process and route the fragment. This is particularly true for out-of-order fragments. For example, if a second IKE fragment that was created by previously known techniques arrives before the first IKE fragment, many NATs or firewalls will not have sufficient information to route it to the appropriate downstream node. Hence, the NAT or firewall will drop the fragment and the IKE packet will not be successfully received at its intended node.

The present invention resolves this issue by, among other things, transmitting smaller size packets and including state information in each IKE fragment. Each IKE fragment created according to the present invention contains an IKE header. In addition, the transmitting node will further include a UDP header on each IKE fragment. The UDP header, in turn, has specific information for NATs, firewalls and other similar devices to process the fragment. The present invention thus insures that each IKE fragment will have the information required by a NAT or firewall for processing, and it reduces and/or eliminates the need for certain types of NATs or firewalls to employ their own fragmentation and reassembly processes.

In a preferred embodiment, the transmitter module 151 will set a timer to wait for a response after it transmits the fragments to the intended receiving node, step 190. The transmitter module 151 will also check to determine whether a responder module has transmitted a no acknowledgment message (NAK), step 191. If a NAK is transmitted by the receiving node, based upon conditions described below, and then received by the transmitting node, the appropriate fragment or fragments will be retransmitted, step 192. The transmitter module 151 will continue to wait for a response unless a NAK is received or the timer expires, step 193. If the timer expires, all fragments will again be retransmitted and a new timer will be set, step 190.

The process of transmitting fragments and setting a timer, step 190, determining whether any NAKs have been received, step 191, and determining whether the timer has expired, step 193, is continued until a response is received. After a certain number of cycles, the transmitter module will eventually abort the process of attempting to transmit the fragmented IKE payload. This is indicated by the dashed line at step 193.

If a response is received, however, the final step of the transmitting process, step 194, is to determine whether it is an appropriate response to the original IKE payload. If yes, control is passed back to the IKE protocol stack, which again continues according to its protocol, step 183. If, on the other hand, the responder node still does not provide an appropriate response, step 194, the fragmenter 150 will abort the process of establishing an SA, step 187. In the preferred embodiment, the fragmenter 150 will retransmit all fragments for two or more times before aborting the entire process. Thus, if an appropriate response is not received at step 194, the transmitting module 151 will return to step 190 for a predetermined number of times before it aborts the process.

Figure 9:
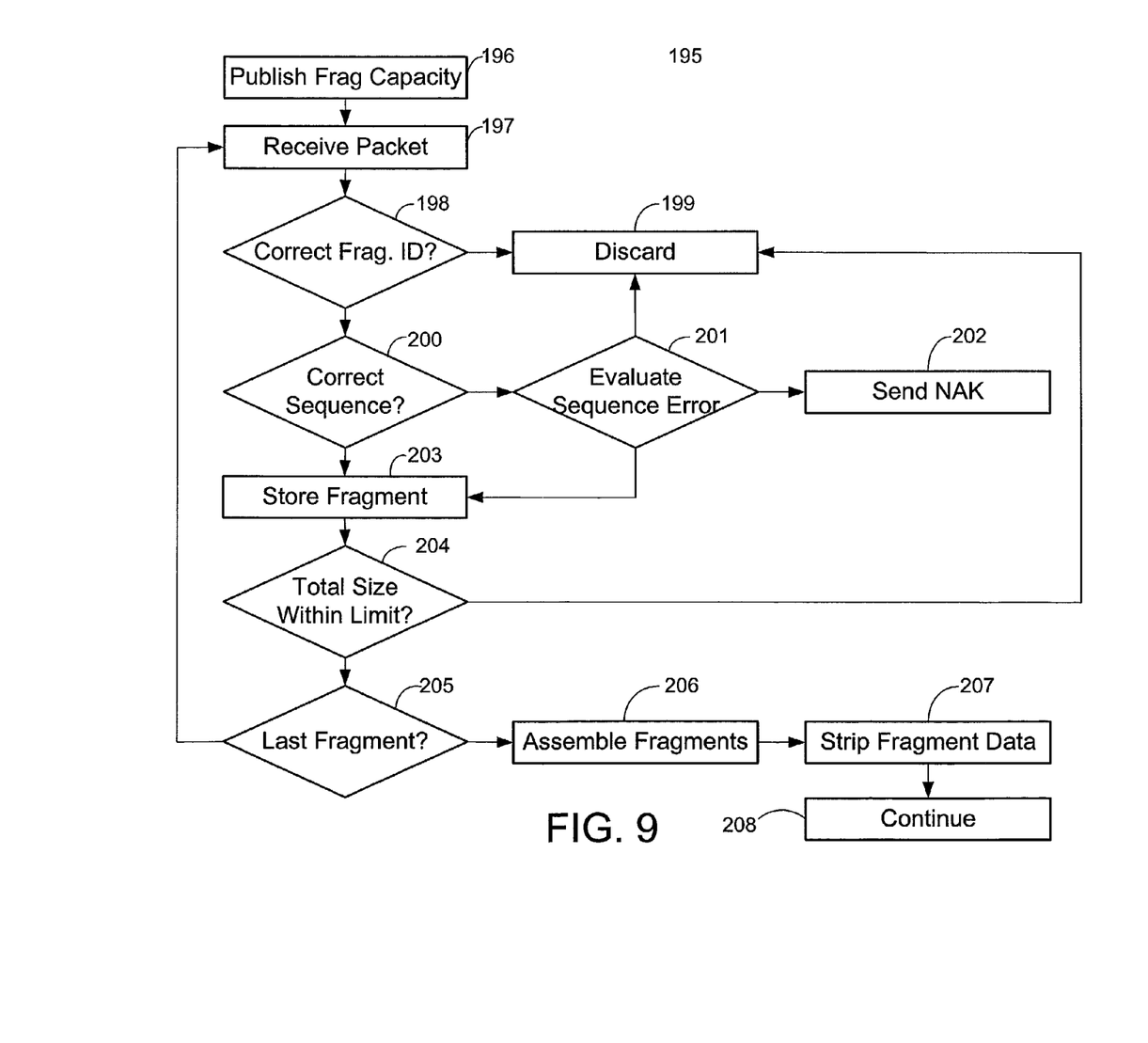
FIG. 9 is a flow chart diagram illustrating certain preferred steps for receiving and reassembling an IKE data packet that has been fragmented.

FIG. 9 generally illustrates the logical flow of the code module that implements fragmenter 150 on a receiving node, particularly the receiving module 152. As with FIG. 8, it should be understood that this flow diagram is provided for a preferred embodiment and is not exhaustive of all possible modifications that would be understood by a person of skill in the art. It should be further understood that certain steps identified FIG. 9 may be performed by the transmitting module and/or the receiving module of fragmenter 150.

The first step illustrated in FIG. 9, although not necessarily the first operation for the receiving module within the fragmenter 150, is to publish its capacity to handle IKE messages that are fragmented according to the invention, step 196. This step is performed in the preferred embodiment by the transmission of the receiving node's vendor ID. In the alternative, it is possible for the receiving module 152 of fragmenter 150 to transmit a specific message, whether in response to a specific query or not, that indicates its capability to handle fragmented IKE payloads (not shown). This step may be performed early in the initiator's attempt to establish an SA or only upon detection of a problem.

Due to the location of the fragmenter module 150, its receiving module 152 will receive or intercept all packets that are destined for IKE protocol stack 127. If the original IKE payload is successfully received without fragmentation, the receiving module will pass the original payload to the responder node's IKE protocol stack 127 (step not shown) for its usual processing. The receiving module 152, however, will intercept and consume all IKE packets that have been fragmented according the invention, step 197. Thereafter, the receiving module will use the fragment's metadata to process the fragment itself.

In one embodiment of the invention, the receiving module will check the fragment identification (fragment ID) of the received fragment, step 198. The data structure described above contains a field for the fragment ID that may be used in this step. Each fragment that corresponds to a single, non-fragmented IKE payload will have the same fragment ID. The receiving module of fragmenter 150 will discard any packet fragment, step 199, that does not contain an appropriate fragment ID. The receiving module of a preferred embodiment may process only a predetermined number of IKE payloads at any instant in time, albeit a fragmented IKE payload, before it attempts to process any others. In a preferred embodiment, this predetermined number is one. Thus, the receiving module must receive all fragments that correspond to a single IKE payload, i.e., all fragments that have the same fragment ID, before it attempts to process fragments that contain a different fragment ID.

In addition, the receiving module 152 within a preferred embodiment of the invention will examine the sequence number of each received fragment, step 200, to determine whether the sequence number of the fragment is in an appropriate order. If yes, the fragment is stored in a buffer for further processing, step 203. If not, the receiving module will evaluate the out-of-sequence error condition, step 201. In this step, the receiving module determines whether to store a particular fragment, discard it and/or send a NAK message to the initiator node. For example, if the first and third fragments in a sequence have been received, but not the second, the receiving module may send a NAK to the transmitting module 151 of the initiator node to retransmit the appropriate fragment, step 192 of FIG. 8. On the other hand, if a fragment is received that contains the identical sequence number to a fragment that was previously received, the receiving module 152 may discard the fragment or all fragments that contain a particular fragment ID. As yet another option, the receiving module may determine, according to a set of predetermined rules, that the out-of-sequence fragment ought to be stored for further processing, step 203. In this last option, it may be desirable to store at least one fragment whose sequence number differs from a prior fragment's sequence number by a small amount. The rules for determining which out-of-sequence fragments to store and which to discard may be created and flexibly applied depending on the desired response of a particular system.

After a fragment has been stored, the receiving module 152 will then determine whether the total length of all received and stored fragments exceeds a predetermined size threshold, step 204. In a preferred embodiment, this is a 64K byte limit because that is the maximum size for any given IKE payload.

This determination may be flexibly implemented and modified to prevent or mitigate denial-of-service attacks or other similar attacks, such as those associated with the man-in-the-middle attacks. If the total size limit is exceeded, the receiving module 152 discards all fragments that contain the same fragment ID, step 199.

Thereafter, the receiving module 152 evaluates the flags on the stored fragment to determine whether it is the last in the sequence of fragments. If not, the receiving module returns to wait for additional fragments, step 197. If the fragment is the last in sequence, the receiving module next determines whether it has received all fragments that correspond to a particular fragment ID, step 206. If not all fragments pertaining to a particular IKE payload have been received, the receiving module again returns to await additional fragments, step 197. The incoming packets are then evaluated as described above until either all fragments corresponding to a particular IKE payload have been received or until a fragment is received that contains a new fragment ID. In the latter case, as described above, the current assembly is discarded according to steps 198 and 199. If all fragments in the sequence are received, however, the packet is assembled into correct order, step 207. The step of assembling the packet should be understood to include all necessary operations to repackage the original IKE payload, including the stripping of all data that is related to the fragmentation process. In the final step, step 208, the receiving module 152 passes the reassembled IKE payload to the IKE protocol stack 127 for its ordinary processing.

In the foregoing description of the preferred embodiment, the receiving module 152 will discard a fragment assembly if it receives a fragment that has a later-in-time fragment ID. In other words, only one IKE payload will be processed at a time. This process will maximize security and mitigate the effects of a denial-of-service or other similar attack. In alternative embodiments, however, more than one IKE payload could be processed by the receiving module 152. For example, a discrete number of IKE payloads, such as two, three, fifteen, twenty-seven, etc., could be tracked as received.

In addition, in another possible embodiment of the receiver module 152, the fragment data contents are validated prior to reassembly according to known methods. This validation assists in determining, at an early stage in the receiving process, whether the fragment that is received has been transmitted from a valid peer.

It can thus be seen that a new a useful method and apparatus for transmitting IKE messages via a computer network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for transmitting Internet Key Exchange (IKE) data packets across a network comprising the steps of:
   receiving a vendor identification value from a receiving node;
   in response to receiving the vendor identification value, using the vendor identification value to determine that the receiving node is IKE fragmentation capable;
   generating and transmitting an IKE packet to the receiving node over a network, the IKE packet having an original IKE header;
   determining whether a response to the IKE packet was received within a predetermined time interval;
   determining a maximum transmission unit size for the network;
   fragmenting the IKE packet into a plurality of smaller packets that do not exceed the maximum transmission unit size, wherein each of the smaller packets includes a header formatted according to the IKE protocol; and
   transmitting each of the plurality of smaller packets over a network.

2. The method of claim 1 wherein each of the smaller packets includes a header formatted according to the IKE protocol and each of the headers formatted according to the IKE protocol includes an identifier that may be used to associate the smaller packet with the IKE packet.

3. A network node that communicates with other network nodes according to the Internet Key Exchange (IKE) protocol, the network node comprising:
   a network interface card for interfacing with a network;
   a User Datagram Protocol (UDP) stack that is capable of generating UDP data packets for transmission over a network;
   an IKE protocol stack that generates IKE data packets that are subsequently processed by the UDP protocol stack; and
   a fragmenter module that:
     receives a vendor identification value from a network node and in response to receiving the vendor identification value uses the vendor identification value to determine that the network node is IKE fragmentation capable;
     intercepts IKE data packets prior to being processed by the UDP protocol stack and splits the IKE data packets into a plurality of smaller data packets that may be subsequently formatted by the UDP protocol stack, wherein each of the plurality of smaller data packets includes a header formatted according to the IKE protocol and state information for network address translator processing, wherein the fragmenter module does not split the IKE data packets when a response to a previously-sent IKE data packet has been successfully received within a predetermined time interval.

4. A system for transmitting Internet Key Exchange (IKE) protocol data packets across a network, the system comprising:
   means for generating an IKE packet;
   means for storing said IKE packet;
   means for initializing, operating, and monitoring a timer;
   means for detecting whether the IKE packet was successfully received at an intended receiver node before the expiration of the timer;
   means for receiving a vendor identification value from the receiver node and using the vendor identification value to determine that the receiver node is IKE fragmentation capable;
   means for fragmenting the IKE packet into smaller packets when the IKE packet was not successfully received at the receiver node;
   means for adding a separate IKE fragment header to each of the smaller packets;

means for adding state information to each of the smaller packets for network address translator processing;

means for adding a separate User Datagram Protocol header to each of the plurality of smaller packets; and means for transmitting each of the plurality of smaller packets over the network.

5. The system of claim 4 further comprising means for determining the capability of the receiver node for receiving fragmented packets.

6. A method for transmitting data packets across a network comprising the steps of:

generating and transmitting an Internet Key Exchange (IKE) packet over a network to a receiving node, the IKE packet having an original IKE header;

fragmenting of the IKE packet by an IP protocol layer;

determining whether a response to the IKE packet was received within a predetermined time interval;

using a vendor identification value received from the receiving node to determine whether the receiving node is capable of processing IKE fragments;

fragmenting the IKE packet into a plurality of smaller IKE packets to avoid the fragmenting of the IKE packet by the IP protocol layer;

adding a separate IKE fragment header to each of the plurality of smaller IKE packets, wherein one of the plurality of smaller IKE packets includes the original IKE header;

adding state information to each of the plurality of smaller IKE packets for network address translator processing;

adding a separate User Datagram Protocol header to each of the plurality of smaller IKE packets; and transmitting each of the plurality of smaller IKE packets over a network.

7. The method of claim 6 wherein the plurality of smaller packets contain the same information as that contained within the original IKE packet.

8. A method for transmitting data packets across a network comprising the steps of:

receiving a vendor identification value from a receiver node;

in response to receiving the vendor identification value, using the vendor identification value to determine that the receiver node is IKE fragmentation capable;

generating a data packet containing Internet Key Exchange (IKE) information the data packet having an original IKE header;

initializing a timer;

determining, based at least in part on the expiration of the timer, whether fragmentation of the data packet is necessary to successfully transmit the IKE information to the receiver over a network;

fragmenting the data packet if necessary into a plurality of smaller packets that may be transmitted over a network;

adding a separate IKE fragment header to each of the plurality of smaller packets, wherein one of the plurality of smaller packets includes the original IKE header;

adding state information to each of the plurality of smaller packets for network address translator processing;

adding a separate User Datagram Protocol header to each of the plurality of smaller packets; and transmitting each of the plurality of smaller packets over a network.

* * * * *